United States Patent Office 3,249,454
Patented May 3, 1966

3,249,454
ORGANIC DISPERSANTS FOR ORGANIC PIGMENTS IN LIQUID ORGANIC SYSTEMS
Charles R. Williams, Longmeadow, Mass., assignor to Monsanto Company, St. Louis, Mo., a corporation of Delaware
No Drawing. Filed June 4, 1964, Ser. No. 372,697
4 Claims. (Cl. 106—309)

This application is a continuation-in-part of copending application Serial No. 229,721, filed October 10, 1962 and now abandoned.

This invention relates to an improved method of dispersing organic pigments in liquid organic systems.

The dispersing of organic pigments in a liquid organic medium has always presented the problem of obtaining an effective and a stable dispersion of the organic pigment. This problem exists because of the complex structure of organic pigments and because of their generally high molecular weights. A satisfactory dispersion of these pigments is necessary in order to prevent settling and caking of the pigment, particularly while the dispersion is being stored or shipped. In addition, effective and stable dispersions of organic pigments is of particular importance when coating compositions are employed in the recently popular household pressure-type spray containers. In some of these coating compositions, complex organic pigments are dispersed in an organic medium. Settling or caking of such a pigment would be extremely detrimental to the proper operation of these spray containers.

Therefore, the obtaining of effective and stable dispersions of organic pigments in an organic medium by employing an organic dispersing agent therein, is of extreme importance to the industry.

Thus, it is an object of this invention to provide an improved process for preparing liquid organic dispersions of organic pigments by employing certain organic polymers therein as a dispersing agent.

Briefly, according to this invention, the foregoing and other objects are attained by incorporating in an organic medium containing an organic pigment, the tertiary alkyl ammonium salt of an ester of an olefin-maleic anhydride copolymer, which is an effective dispersant for organic pigments therein.

The following example is set forth to illustrate more clearly the principle and practice of this invention and is not intended to limit the scope thereof. Unless otherwise indicated, all parts are parts by weight.

Example I

Mix together stoichiometrically equivalent portions of benzyl alcohol and an ethylene-maleic anhydride copolymer having a molecular weight of about 1500. The molecular weight is determined by the specific viscosity of a 1% solution of the ethylene-maleic anhydride copolymer in dimethyl formamide. Slowly heat the resulting moist powder in a flask, fitted with a reflux condenser, until the mass liquifies at between 110–140° C. Increase the temperature to reflux temperature and hold for about 10 minutes. While still in the liquid state, pour into a cooling pan and allow to cool to room temperature. The solid mass formed thereby is the half benzyl ester of the ethylene-maleic anhydride copolymer. Grind this mass to a powder and dissolve 6.1 parts thereof in 90 parts of xylene, which contains therein 3.9 parts of tri(n-propyl)-amine so as to form a 10% solids solution of the tri-(n-propyl)amine salt of the half benzyl ester of the ethylene-maleic anhydride copolymer.

Prepare two dispersion samples as follows:
(1) 25 parts of the above solution,
  10 parts of Phthalocyanine Blue (Monastral Blue),
(2) 25 parts of the above solution,
  10 parts of Toluidine Red (C.P. Toner A-2990).

Each sample is a satisfactory dispersion of the organic pigment in the organic medium employed therein. There is little or no settling of the organic pigment.

This invention is directed to an improved process for preparing an effective and stable dispersion of an organic pigment in a liquid organic medium by incorporating therein a tertiary alkyl ammonium salt of an ester of an olefin-maleic anhydride copolymer. The quantity of said salt of the said ester necessary to produce an effective dispersion is 0.1–7.0 weight percent based on the weight of the organic pigment employed. The salt of the ester of an olefin-maleic anhydride copolymer has in its structure recurring groups of the formulae:

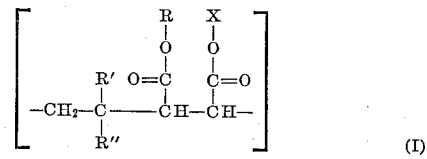
(I)

and

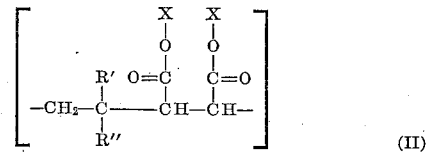
(II)

with the groups of Formula I constituting 50–100% and preferably 80–100% of the total of the groups of Formulae I and II; wherein R is selected from the group consisting of aralkyl and cycloalkyl radicals; R′ is selected from the group consisting of hydrogen, methyl and ethyl radicals; and R″ is selected from the group consisting of hydrogen and methyl, providing that when R′ is ethyl, R″ is hydrogen. The aralkyl radicals of the above composition have an aliphatic moiety of 1–10 carbon atoms and an aromatic moiety of 1–2 rings associated therewith, and the cycloalkyl radicals have 5–7 carbon atoms. In the above composition, X is a positive charged ion formed from a tertiary alkyl amine. In the practice of this invention, the preferred tertiary alkyl ammonium salt of an ester of an olefin-maleic anhydride copolymer is the tri-(n-propyl)ammonium salt of the benzyl ester of an ethylene-maleic anhydride copolymer.

In the practice of this invention, the molecular weight of the tertiary alkyl ammonium salt of the ester of an olefin-maleic anhydride copolymer is significant as to its use as a dispersant for organic pigments in a liquid organic medium. The copolymer employed in this invention to prepare the salt thereof should have a weight average molecular weight of up to about 10,000 and preferably 800–4000 and more particularly 1000–2500. In the preferred embodiment of this invention wherein the salt of the copolymer is the tri(n-propyl)ammonium salt of the benzyl ester of an ethylene-maleic anhydride copolymer, the recurring groups of Formulae I and II total 3–20 for the preferred weight average molecular weight of about 800–4000 for the copolymer portion of the groups of Formulae I and II. Depending upon the structure of Formulae I and II and in particular where the salt of the copolymer consists of 100% of Formula I, the number of recurring groups thereof can total up to about 45 in order to achieve a weight average molecular weight of 10,000 for the copolymer portion of the group of Formula I. If the weight average molecular weight of the olefin-maleic copolymer portion of the groups as set forth in Formulae I and II is in excess of 10,000, the dispersing effect of the salt of the copolymer is no longer practicable and probably serves little use in dispersing organic pigments in a liquid organic medium. Optimum dispersing action is generally achieved with the copolymer portion having a weight average molecular weight of 1000–2500.

Broadly, the process for preparing the polymers employed herein comprises mixing the particular olefin-maleic anhydride copolymer with up to a stoichiometrically equivalent portion of an alcohol. The mixture is maintained at a temperature ranging from about 50° C. to about 220° C. for a period from about 2 minutes to 90 minutes.

The preferred process for preparing the polymers employed herein comprises (a) mixing the particular olefin-maleic anhydride copolymer with up to a stoichiometrically equivalent portion of an alcohol, (b) heating the mixture until the mass liquifies, (c) refluxing for a period of from about 10 minutes to 90 minutes, and (d) cooling the liquid to room temperature and thus solidifying to a solid mass. The product thus obtained from the reaction is the acid form of the ester of the particular olefin-maleic anhydride copolymer.

The olefin-maleic anhydride copolymers employed in the practice of this invention may be either an ethylene-maleic anhydride, a propylene-maleic anhydride, a butylene-maleic anhydride, or an isobutylene-maleic anhydride copolymer. The basic structure of these copolymers have recurring groups of the formula:

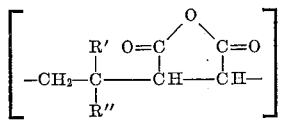

wherein R' is selected from the group consisting of hydrogen, methyl and ethyl radicals, and R" is selected from the group consisting of hydrogen and methyl radicals. However, when R' of the above formula is ethyl, then R" is hydrogen. The preferred olefin-maleic anhydride copolymer is an ethylene-maleic anhydride copolymer wherein R' and R" in the formula are hydrogen and the number of recurring groups of the formula are 3–20.

The alcohol employed in the practice of this invention and reacted with the olefin-maleic anhydride copolymer is represented by the formula:

R—OH wherein R is selected from the group consisting of aralkyl and cycloalkyl radicals. The aralkyl radicals of the above formula have an aliphatic moiety of 1–10 carbon atoms and an aromatic moiety of 1–2 rings associated therewith. The cycloalkyl radicals have 5–7 carbon atoms.

Typical examples of the alcohols which can be employed in the practice of this invention are benzyl alcohol, phenyl benzyl carbinol, phenyl ethyl alcohol, cyclohexyl alcohol, cycloheptanol, o-methyl cyclohexyl alcohol and mixtures of the above. The preferred alcohol of this invention is benzyl alcohol wherein R is a benzyl radical.

In the practice of this invention, the tertiary alkyl ammonium salt of the ester of an olefin-maleic anhydride copolymer is soluble in such organic media as mineral spirits, methyl ethyl ketone, toluol, xylol, etc., and mixtures thereof. The tertiary alkyl amines suitable for producing the corresponding salts of the said esters have in each aliphatic alkyl moiety 2–6 carbon atoms and preferably 3–5 carbon atoms. Typical amines of this class, which may be employed in the practice of this embodiment, are tri-ethylamine, tri-isopropylamine, tri(n-propyl) amine, tri-butylamine, tri-isobutylamine, and mixtures thereof.

The advantages of this invention are found in the ability of the tertiary alkyl ammonium salt of the ester of an olefin-maleic anhydride copolymer to disperse organic pigments so as to provide stable dispersions of the organic pigments while storing or shipping. Typical examples of a few of the organic pigments which are readily dispersed are the Phthalocyanine Blues, Phthalocyanine Greens, Toluidine Reds, Hansa Yellow, B.O.N. Reds, Litho Reds, and Para Reds. A few specific applications include textile print paste systems such as oil-in-water, water-in-oil or straight oil, printing inks, predispersed organic pigment systems, dispersions of organic pigments in "oil" base surface coating compositions, dispersions of organic pigments in organic aerosol formulations such as acrylate resin in a solvent solution, dispersions of insecticides, fungicides and dispersions of rubber chemicals for the purpose of satisfactory compounding.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

What is claimed is:

1. In a process for preparing dispersions of insoluble organic pigments in a medium consisting of liquid organic medium; the improvement which comprises incorporating in the liquid organic medium a tertiary alkyl ammonium salt of an ester of an olefin-maleic anhydride copolymer in the amount of 0.1–7.0 weight percent based on the weight of the organic pigment dispersed therein; said tertiary alkyl ammonium salt of the ester of an olefin-maleic anhydride copolymer having a weight average molecular weight of up to about 10,000 and having in its structure recurring groups of the formulae:

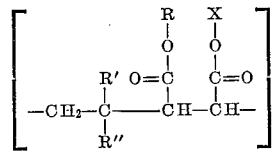 (I)

and

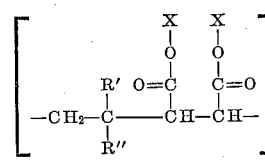 (II)

with the groups of Formula I constituting 50–100% of the total of groups (I) and (II); wherein R is selected from the group consisting of aralkyl and cycloalkyl radicals; R' is selected from the group consisting of hydrogen, methyl and ethyl; R" is selected from the group consisting of hydrogen and methyl, providing that when R' is ethyl, R" is hydrogen; said aralkyl radicals having an aliphatic moiety of 1–10 carbon atoms and an aromatic moiety of 1–2 rings associated therewith; said cycloalkyl radicals having 5–7 carbon atoms; and X is an ion formed from a tertiary alkyl amine wherein each aliphatic alkyl moiety thereof has 2–6 carbon atoms.

2. A process as described in claim 1 wherein the number of groups of Formulae I and II total 3–20.

3. A process as described in claim 1 wherein the tertiary alkyl ammonium salt of the ester of the olefin-maleic anhydride copolymer is the tri(n-propyl)ammonium salt.

4. A process as described in claim 1 wherein the salt of the ester of an olefin-maleic anhydride copolymer is the tri(n-propyl)ammonium salt of the benzyl ester of an ethylene-maleic anhydride copolymer.

References Cited by the Examiner

UNITED STATES PATENTS

| | | | |
|---|---|---|---|
| 2,913,437 | 11/1959 | Johnson | 106—308 |
| 2,977,334 | 3/1961 | Zopf et al. | 260—78.5 |
| 3,000,840 | 9/1961 | Johnson et al. | 260—29.6 |
| 3,037,875 | 6/1962 | Geiser | 106—308 |
| 3,088,837 | 5/1963 | Pescott et al. | 106—308 |

TOBIAS E. LEVOW, *Primary Examiner.*